July 27, 1948.   W. S. JENNINGS ET AL   2,445,950
CONVEYER SWITCH
Filed June 13, 1945   3 Sheets-Sheet 3
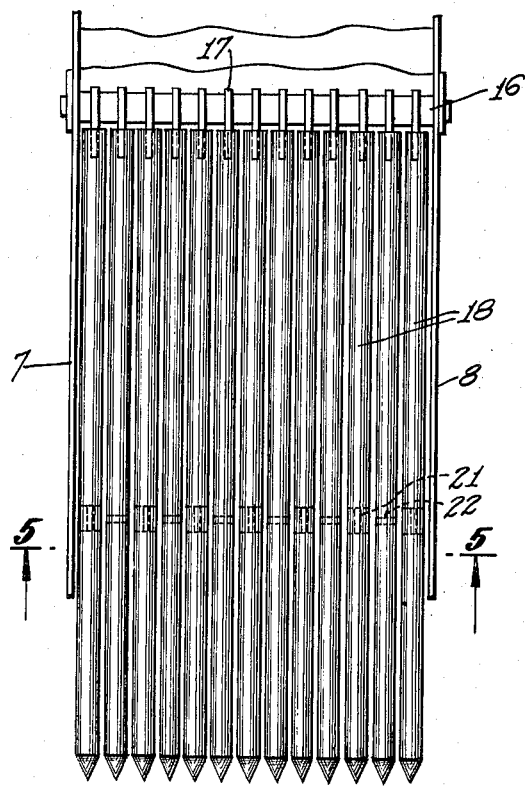
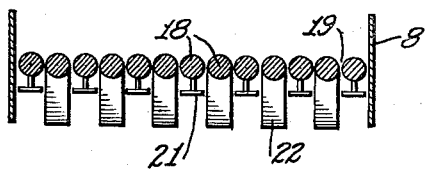
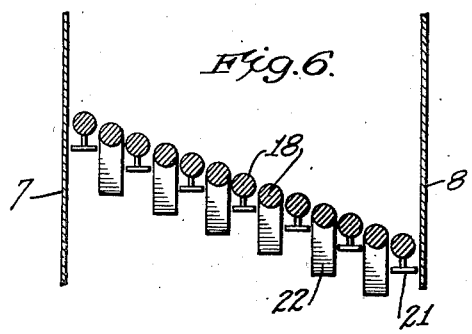
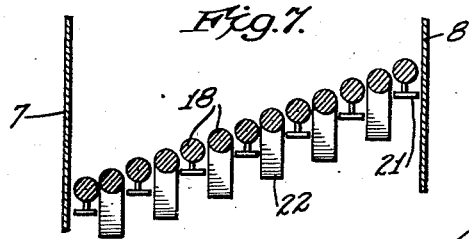
INVENTORS
WILLIAM S. JENNINGS
WALTER ROWLAND
BY
ATTORNEY Patented July 27, 1948

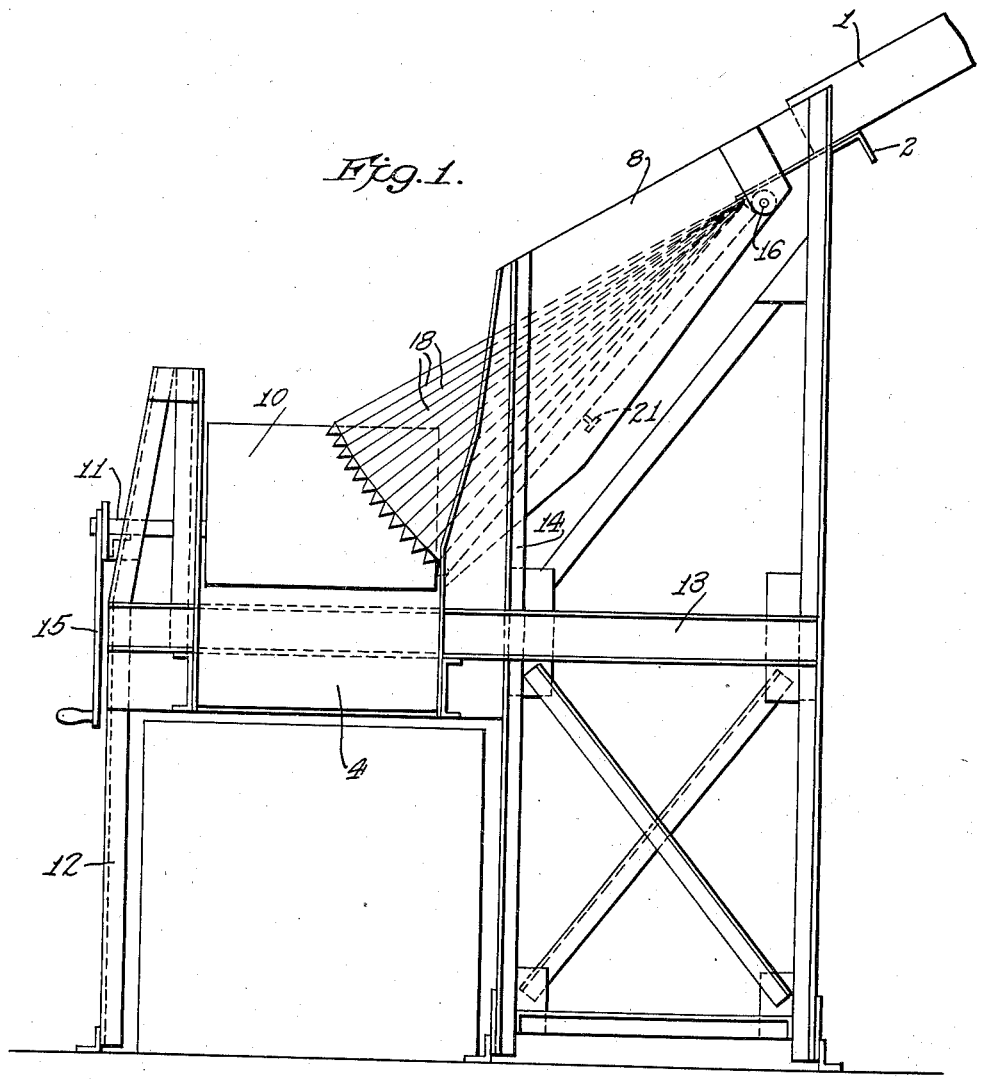

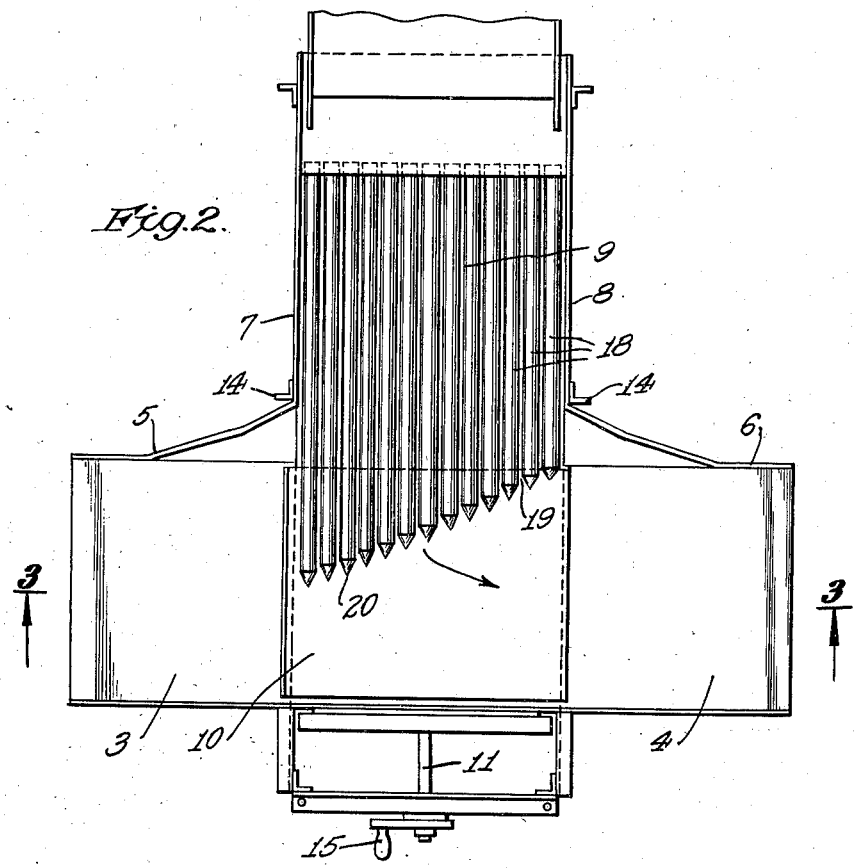
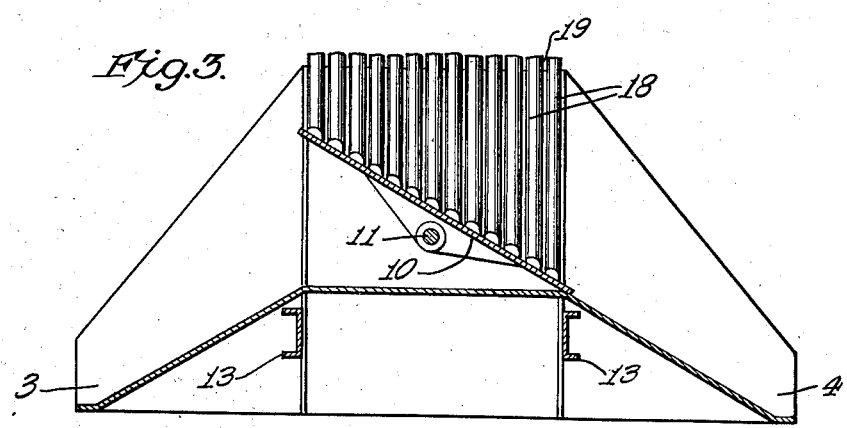

2,445,950

UNITED STATES PATENT OFFICE 2,445,950

CONVEYER SWITCH

William S. Jennings, Richmond, and Walter Rowland, Petersburg, Va., assignors to Allied Chemical & Dye Corporation, a corporation of New York Application June 13, 1945, Serial No. 599,204

10 Claims. (Cl. 193—31)

1

The present invention relates to a conveyer and more particularly to a gravity conveyer for bags, packages and other articles for conveying and discharging the same in either of two directions.

Gravity conveyers for conveying bags, packages and other articles from a package or storage room of a factory to a loading platform at a lower level are well known. Such conveyers ordinarily include an inclined main chute or section leading from the packaging room and feeding into a deflecting chute or section located crosswise at the lower end of the main chute. The deflecting chute is supported so that it may be tilted into two working positions for deflecting the bags or packages, thereby delivering the same to one of a pair of delivery chutes or conveyer sections which feeds the bags or packages to the desired destination. Such conveyers have the disadvantage that rupture or other damage of the bag or package is caused by the abrupt deflection and dropping of the bag or package from the main chute or conveyer section to one of the delivery sections, due to impact between the bag or package and the walls or floor of the deflecting chute. Such damage is particularly noticeable when the bag or package is deflected thru a large angle.

It is an object of this invention to provide a conveyer which can be used for conveying bags, packages or other articles thru a path involving a deflection or change in direction to deliver the same at the desired destination while avoiding subjecting the articles during the course of their deflection to impact, or other forces which might cause damage thereto. Other objects and advantages of this invention will be apparent from the following description.

In accordance with this invention the conveyer comprises a main section, two delivery sections preferably at right angles to the main section, and a connecting section having a surface so constructed that it may be deflected from a position in which the main section communicates with one of the delivery sections into a position in which the main section communicates with the other of the delivery sections. The connecting section is the essential part of the conveyer embodying this invention since it accomplishes the main objective of the invention by providing a reasonably smooth path through which the articles move from the main section of the conveyer to one of the delivery sections when the connecting section is in one operative position, and when the connecting section is in the other operative position the articles move from the main section to the other delivery section without being subjected to impact, e. g. such as may be caused by dropping or subjecting the bag to impact with a wall or obstruction to change its direction of movement.

In the preferred embodiment illustrated on the drawings, the invention is shown incorporated in a conveyer of the gravity type having an inclined main chute communicably connected with two delivery chutes extending at right angles thereto by a hinged cross chute, and the present description will be confined to the present illustrated embodiment of the invention. It will be understood, however, that the novel features and improvements are susceptible to other applications, such, for example, as conveyers in which the main section and the delivery sections have conveying belts or rollers for moving the articles. Hence, the scope of this invention is not confined to the embodiment herein described.

In the accompanying drawings, in which like reference characters refer to like parts, Fig. 1 is a side elevation of a conveyer, the main chute being fragmentarily shown, embodying the present invention;

Fig. 2 is a plan view of the conveyer of Fig. 1;

Fig. 3 is a section taken on a plane passing through the line 3—3 of Fig. 2;

Fig. 4 is a plan view of the portion of the conveyer forming the deflecting surface connecting the main chute with the cross chute;

Fig. 5 is a section taken on a plane passing through line 5—5 of Fig. 4; and

Figs. 6 and 7 are sections corresponding to that of Fig. 5 but showing the deflectable surface in different operative positions.

Referring to the drawings, the conveyer comprises a main chute 1, which is suitably supported by angle or other structural support 2 and is inclined for gravity flow of articles therethrough. Extending at right angles to the main chute 1 are two delivery chutes 3 and 4, which are disposed at a lower level than the discharge end of the main chute 1 and are arranged to deliver articles fed thereto from the main chute to desired destinations, such as railroad car, truck, etc. These delivery chutes are disposed in fixed position and have side walls 5 and 6 suitably secured to the side walls 7 and 8 of the conveyer section 9 constituting the deflectable portion of the conveyer, which portion is hereinafter more fully described.

Positioned between delivery chutes 3 and 4 is a cross chute 10. This cross chute is rigidly attached to a horizontal shaft 11 which can be made to rotate in two journals that rest on bend 12. The latter is part of frame 13 made up of suitable channel and angle irons that support the deflecting portion. The side walls 7 and 8 are attached to angle posts 14 (Fig. 1) extending upward from the framework 13. Handle 15 is keyed to shaft 11 and may be operated to move the hinged or pivoted chute 10 from the position shown in Fig. 3, in which it delivers articles fed thereto to chute 4, to its other operative position, in which it delivers the articles to chute 3.

The deflectable conveyer section 9 is supported at its upper end by a shaft 16 journalled in the lower end of the inclined chute 1. This deflectable portion or surface consists of a series of bars 18 secured at their upper ends to ring members 17 which fit loosely on shaft 16. The bars 18, spaced to provide a small clearance 19 therebetween, as shown in Figs. 4 to 7, extend between walls 7 and 8 and are inclined downwardly from the main chute 1 in the same general longitudinal direction as the main chute 1. The lower ends of bars 18 rest upon and are movable with pivoted chute 10. Thus bars 18 form a warpable surface which may be warped, by tilting pivoted chute 10, from one to the other of its working positions. This warpable surface and the hinged chute 10 may be considered as a connecting section between the main chute 1 and the delivery chutes 3 and 4.

At a point some distance from the end of bars 18, alternate bars may be provided with T-shaped guide members 21 projecting downward and at right angles to the bars. The remaining bars are provided with flat strips 22 on the under sides thereof, disposed between the heads of the T-shaped members 21 and extending therebeyond, as shown on Figs. 5 to 7, inclusive. These guide members 21 and 22 should be long enough to limit the movement of the bars 18 to their respective vertical planes and prevent one bar from riding upon and overlying a contiguous bar when the bars are moved to place the main chute 1 into communication with one or the other of delivery chutes 3 and 4, as is hereinbelow described. The particular means shown for limiting the movement of the bars may be replaced by any suitable devices that limit each bar to move only in a vertical plane.

As above indicated, the bars 18 cooperate with side walls 7, 8 to define deflectable portion 9 which causes the articles delivered thereto from main chute 1 to flow into either delivery chute 3 or 4 as may be desired. In the positions shown in Figs. 2, 3 and 6, the bars are disposed to form a deflecting surface having its elevated or high portion at the left-hand side, viewing Figs. 2 and 3, and gradually sloping from left to right so that articles passing thereover are gently deflected toward the right, entering the pivoted chute 10, and then passing into delivery chute 4. If it is desired to cause the articles to flow into delivery chute 3, it is only necessary to move the pivoted chute 10 by means of handle 15 about shaft 11. Such movement automatically changes the deflectable portion 9 so that the elevated or high portion of the surface occurs at the right-hand side, viewing Figs. 2 and 3, as shown in Fig. 7, and the surface gradually slopes from right to left, causing the articles passing thereover to be deflected toward the left, entering the hinged chute 10, and thence into delivery chute 3. When it is again desired to cause the articles to move to delivery chute 4, it is only necessary to move hinged chute 10 to the position shown in Fig. 3.

An important feature of the invention is that the chute 10 can be changed from one to the other deflecting positions without interrupting the flow of parcels down the main chute. Another important feature is that although the chute 10 may be locked in its two working positions it need not be because any passing parcel will tend to push the chute from an unintended intermediate position into one or the other working positions.

Since certain changes may be made in the above construction and different embodiments of the invention could be made without departing from the scope thereof, it is intended that all matter contained in the above description or shown in the accompanying drawings shall be interpreted as illustrative and not in a limiting sense.

We claim:

1. A conveyer comprising a main section, a plurality of delivery sections, and a connecting section comprising a warpable conveying surface, said connecting section being constructed and arranged so that the conveying surface thereof may be deflected from a position in which the main section communicates with one of said delivery sections into a position in which the main section communicates with another of said delivery sections.

2. A conveyer comprising an inclined main section, two delivery sections at a lower level than the discharge end of said main section, and a connecting section, the latter comprising a warpable surface extending downwardly in the same general longitudinal direction as the main section and a hinged portion for connecting said surface with either of said delivery sections, said connecting section being constructed and arranged so that the said surface may be deflected from a position in which the main section communicates with one of said delivery sections into a position in which the main section communicates with the other of said delivery sections.

3. A conveyer comprising a main section, a plurality of delivery sections, and a connecting section comprising a warpable conveying surface extending in substantially the same longitudinal direction as the main section, said connecting section being constructed and arranged so that the conveying surface thereof may be deflected from a position in which the main section communicates with one of said delivery sections into a position in which the main section communicates with another of said delivery sections.

4. A conveyer comprising an inclined main chute, two delivery chutes extending in opposite directions at angles to said main chute and disposed at a level below the discharge end of the main chute, a connection between the main chute and the delivery chutes, said connection comprising a deflectable surface and a hinged chute, said deflectable portion and hinged chute being constructed and arranged so that in one operative position of the hinged chute the main chute is communicably connected with one of said delivery chutes and upon movement of said hinged chute into another operative position the said deflectable portion is deflected so that the main chute communicates with the other of said delivery chutes.

5. A conveyer comprising an inclined main chute, two delivery chutes extending in opposite directions at angles to the discharge end of the main chute, a hinged chute disposed between said two delivery chutes, and a plurality of bars extending in substantially the same longitudinal direction as the main chute and connecting the main chute with the hinged chute, the ends of the bars remote from the main chute resting on said hinged chute, the plurality of bars being constructed and arranged so that upon movement of the hinged chute to connect with one of said delivery chutes, the bars form a connecting surface communicably connecting the main chute with one of said delivery chutes and upon movement of the hinged chute into operative position with respect to the other of said delivery chutes the bars form a connecting surface communicably connecting the main chute with the other of said delivery chutes.

6. A conveyer comprising an inclined main chute, two delivery chutes extending in opposite directions at angles to the discharge end of the main chute, a hinged chute disposed between said two delivery chutes, a plurality of bars extending in substantially the same longitudinal direction as the main chute and connecting the main chute with the hinged chute, the ends of the bars remote from the main chute resting on said hinged chute, the plurality of bars being constructed and arranged so that upon movement of the hinged chute to connect with one of said delivery chutes, the bars form a connecting surface communicably connecting the main chute with one of said delivery chutes and upon movement of the hinged chute into operative position with respect to the other of said delivery chutes the bars form a connecting surface communicably connecting the main chute with the other of said delivery chutes, and means for preventing one bar from riding upon and overlying a contiguous bar when the bars are moved upon said movement of the hinged chute.

7. In a conveyer, a conveyer section and a plurality of substantially parallel, closely spaced bars pivotally mounted at one end and constructed and arranged so that they can be moved from a position in which they form a deflecting surface causing the feed of articles passing thereover from the conveyer section to be moved in one direction relative to the conveyer section, to a position in which they form a deflecting surface causing articles passing thereover from the conveyer section to be moved in a different direction.

8. In a conveyer, a conveyer section, a plurality of substantially parallel, closely spaced bars pivotally mounted at one end and constructed and arranged so that they can be moved from a position in which they form a deflecting surface causing the feed of articles passing thereover from the conveyer section to be moved in one direction relative to the conveyer section, to a position in which they form a deflecting surface causing articles passing thereover from the conveyer section to be moved in a different direction, and guide members on the under side of said closely spaced bars for preventing one bar from riding upon and overlying a contiguous bar when the bars are moved from the first-mentioned position to the second-mentioned position.

9. A conveyer comprising a main chute, two delivery chutes disposed at angles to said main chute and a connection between the main chute and the delivery chutes, said connection comprising a deflectable surface and a hinged chute, said deflectable portion and hinged chute being constructed and arranged so that in one operative position of the hinged chute the main chute is communicably connected with one of said delivery chutes and upon movement of said hinged chute into another operative position the said deflectable portion is deflected so that the main chute communicates with the other of said delivery chutes.

10. In a conveyer, a conveyer section, and a plurality of substantially parallel, closely spaced bars pivotally mounted at one end and constructed and arranged so as to constitute a warpable conveying surface and so that said bars can be moved from a position in which they form a deflecting surface causing the feed of articles passing thereover from the conveyer section to be moved in one direction relative to the conveyer section, to a position in which they form a deflecting surface causing articles passing thereover from the conveyer section to be moved in a different direction.

WILLIAM S. JENNINGS.
WALTER ROWLAND.

REFERENCES CITED

The following references are of record in the file of this patent:

UNITED STATES PATENTS

| Number | Name | Date |
|---|---|---|
| 990,058 | Martell | Apr. 18, 1911 |
| 1,038,957 | Pritchett | Sept. 17, 1912 |
| 1,065,349 | Fletcher | June 24, 1913 |
| 1,735,825 | Koch | Nov. 12, 1929 |
| 2,105,922 | Maltby | Jan. 18, 1938 |